United States Patent Office 3,115,712
Patented Dec. 31, 1963

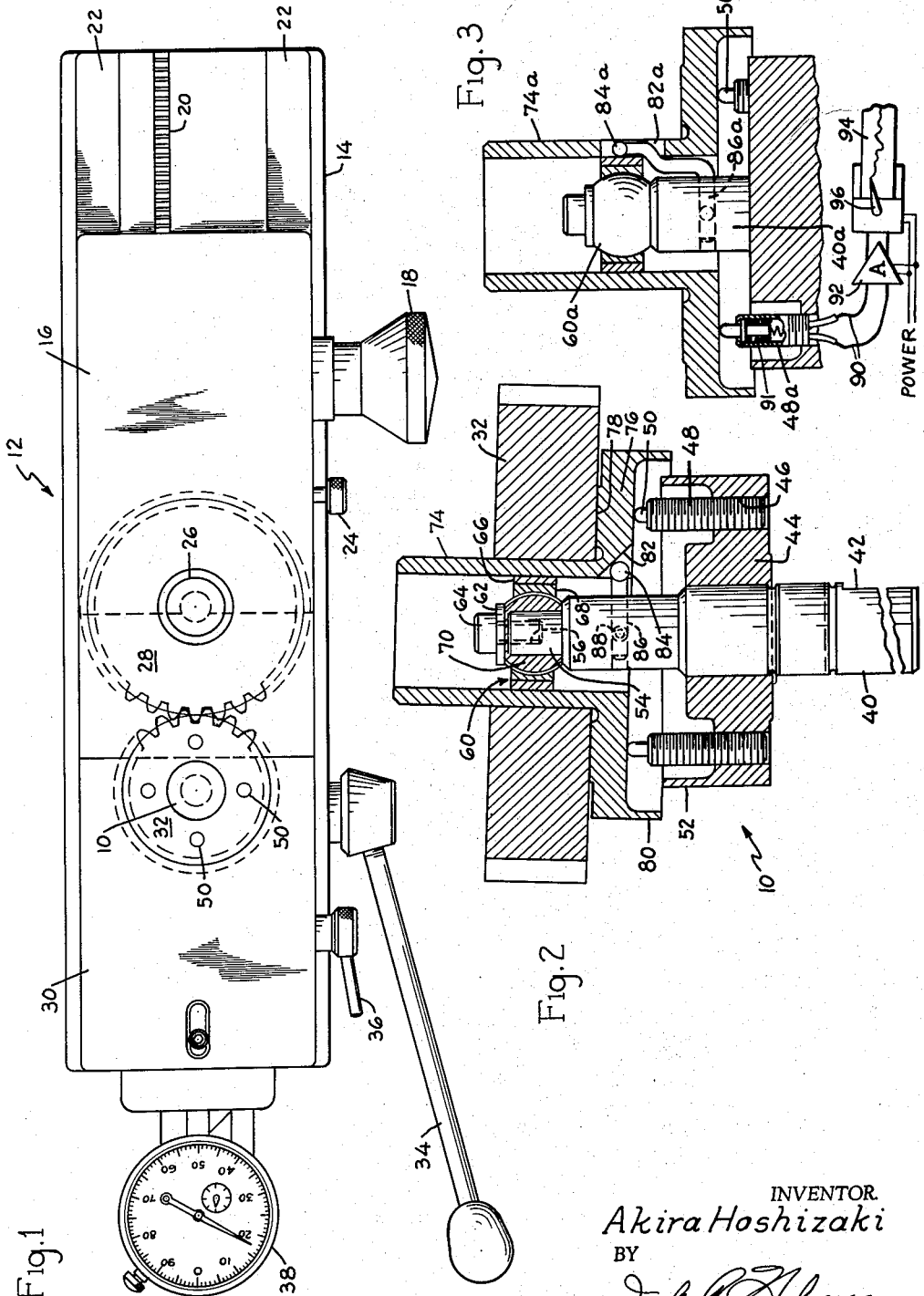

3,115,712
SELF ALIGNING ARBOR
Akira Hoshizaki, Morton Grove, Ill., assignor to Illinois Tool Works Inc., Chicago, Ill., a corporation of Delaware
Filed Sept. 13, 1962, Ser. No. 223,485
15 Claims. (Cl. 33—179.5)

This invention relates to gear testing apparatus. More particularly, it relates to an improved means for mounting gears in such apparatus.

Specifically, the invention relates to an arbor utilizing a spherical bearing joint for mounting either master gears or work gears in gear rolling inspection instruments.

The most common method of mounting a work gear and master gear in order to perform the usual inspection for run out, tooth to tooth errors, nicks, and the cumulative effect of gear errors and sometimes functional size, is by mounting both gears on arbors or studs which are so constrained as to remain parallel. In some cases a similar inspection is performed using a master gear having a different tooth helix angle (or lead) than the work gear. This necessitates placing the arbors in a crossed axis relation but this, as in the parallel axis relationship, is maintained in a rigid relationship. Whether the inspection is performed with parallel axes or crossed axes relationship the only movement allowed is a center distance variation, the magnitude of which indicates the gear defects.

A less common method of mounting the work gear and master gear for rolling inspection is to support one of the two gears on an arbor held in a single or double gimbal which allows movement of one or the other gear such that under a spring or other type of loading, the work gear and master gear come into a more intimate contact. When the spring load urges the two into the most complete contact (and minimum center distance) due to the flexibility of the mounting, errors in lead (or tooth helix angle) of the work gear, for example, are readily observable.

The rigidity of the first type of mounting sometimes allows errors, such as tooth nicks, for example, to remain undetected as a maximum metal condition exists at some point away from the nick. With the rigid mounting, an off lead condition, for example, will cause an increase of center distance sufficient to allow a nick to go undetected as it is away from the metal to metal contact point of master and work gear. Since there is a degree of flexibility in the usual work installed mounting of gears due to the provision for backlash and the inescapable manufacturing errors in the mounting, nicks or other defects unperceived in inspection by the rigid first type of mounting on constrained arbors may be noticeable under actual operating conditions.

The second type of mounting, utilizing gimbals, where one or the other of the two gears is flexibly mounted so that more intimate contact is secured, is more complicated and expensive since it requires extremely precise parts.

The present invention relates to a means for providing a simple inexpensive flexible mounting which is accurate within the limits of the test equipment utilized. It therefore is the primary object of this invention to provide such a simple inexpensive device which can be readily incorporated in new instruments. A secondary object is to provide a device capable of being utilized in testing instruments in existence, wherein rotation of the gears may be by manual operation or by power operation.

A further object of the invention is to provide a flexible arbor for mounting gears for testing which utilizes one or more springs or other means to exercise some restraint upon the wobble motion of the gear mounted on the flexible arbor and to maintain the arbor in a neutral position during loading, etc.

Still another object is to provide one or more sensing heads which can be mounted either integrally or independently of the spring means to detect and display or record the deviations of the gear riding on the flexible arbor from the neutral plane, either independently of the center distance variation or in conjunction with it.

Other and similar objects will become apparent to those skilled in the art when the specification is read in conjunction with the accompanying drawing wherein:

FIG. 1 is a plan view of a gear rolling testing instrument of the type utilizing an embodiment of this invention;

FIG. 2 is an elevational view in partial section of a device embodying the principles taught by this invention and showing the device in a slightly tilted position; and FIG. 3 is an elevational view in partial section of a second device, slightly modified from that shown in FIG. 2 in a neutral plane or position.

A self aligning arbor 10 of the type contemplated by this invention may be utilized with a gear rolling testing instrument 12 of the type as seen in plan view in FIG. 1. It includes a bed or base 14 having a first slide member 16 capable of movement along the longitudinal axis by rotation of the hand wheel 18 which operates a pinion, not shown, which in turn engages the rack 20. The rack 20 runs along the longitudinal axis of the base 14 and permits accurate movement of the slide 16 to a fixed position along the ways 22. Once the slide 16 is in a selected position, it can be locked in place by operation of locking means generally designated 24. An arbor or stud 26, adapted to accept a tooth workpiece or gear 28, is mounted, generally in a vertically disposed substantially perpendicular relationship to one end of the slide 16. For convenience in illustration only a partial number of gear teeth are shown on workpiece 28.

A second slide 30 is mounted on the bed 14 and is slidable along the ways 22. Positioned at one end of slide 30, adjacent the end of slide 16 carrying arbor 26, is self aligned arbor 10 generally parallel to arbor 26 and adapted to accept a second gear 32. Preferably slide 30 is spring loaded towards slide 16 to insure contact between the teeth of gears 28 and 32 while they are either manually, or by power means, rotated in contact with one another. Throw out lever 34 is provided as means for moving slide 30 away from slide 16 and to remove the spring action, not shown, which forces slide 30 in the direction of slide 16. Positive locking means 36 is shown whereby slide 30 can be locked in a selected position along the axis of bed 14. At the end of the bed 14 there is positioned an indicator means 38 for the purpose of recording the movement between the center distances of arbors 10 and 26.

As has been noted above, a device of the type described can be utilized for inspections of gear workpieces with a master gear for run out, tooth to tooth errors, nicks cumulative effective gear errors other than those mentioned and sometimes functional size. To insure positive metal contact where there might be deviations in lead or tooth errors which prevent the disclosure of nicks it is my intent to provide a self aligned arbor 10. Such an arbor includes a center post 40 having suitable means at one end to prevent rotation between the center post 40 and slide 30, such as a flat 42 engaged by a set screw or key.

Positioned intermediate the extremities of center post 40 is a laterally extending flange 44 which in the present instance is annular in configuration, but which may, if desired, be square or any other configuration. Flange 44 can be formed integral with center post 40 or may be fabricated independently and press fit into position. A plurality of through bores 46 are provided in flange 44 in concentric relation to the center post 40. In the present instance, four of such bores are shown and are positioned in quadrature. If any other number of bores are utilized, it is generally contemplated that they would be equispaced on a circle concentric with the center post axis. An equal number of adjustable means 48 are complementally accepted within the threaded bores 46. The adjusttable means 48 extend upwardly from flange 44 in a direction opposite to the end of the center post set into slide 30. Extending in the same direction from flange 44 are spring loaded fingers or probes 50 carried by the adjustable means 48, for purposes best set forth hereinafter. An upwardly extending skirt 52 may be provided around the periphery of flange 44 to serve as protection for the adjustable means 48 and the spring means 50 carried thereby.

At the end opposite to flat 42, center post 40 is reduced in diameter as at 54 and is axially bored and threaded as at 56. A spherical bearing or ball and socket joint 60 encircles the reduced portion 54 of center post 40 and is maintained in position by a retaining ring or washer 62 and cap screw 64. The spherical bearing 60 is of a type commonly known and includes an outer ring 66, an inner race 68 and a ball 70 complementary to the inner race 68. As is common practice, the spherical inner race can be a solid bronze insert or may be provided with other types of bearing materials as is well known in the art. Similarly, the spherical portion 70 may, if desired, be formed integral with center post 40.

An arbor sleeve 74 is press fit over outer ring 66 in such a fashion that it is positioned intermediate the inner extremity of sleeve 74. Sleeve 74 has an inner diameter which is greater than the outer diameter of center post 40 and is complementary to the outer diameter of the outer ring 66. Flange means 76 extend laterally from sleeve 74, and in the present instance is generally complementary in shape to but greater in diameter than the flange means 44. The upper surface of flange 76 is provided with a bearing surface 78 which extends above the upper surface of flange 76 and is annular and concentric with sleeve 74. Flange 76 may also be provided with a depending skirt 80 which is greater in diameter than but axially overlapping skirt 52 for the protection of adjustable means 48 and its associated spring loaded probes 50. The master gear 32 shown in section is adapted to encircle sleeve 74 in its bore and to have one face seated on bearing 78. It should be noted that bearing 78 is preferably a ground surface which is perpendicular to the axis of sleeve 74.

While spherical bearings can be extremely accurate, it has been found that most of the commercial spherical bearings are not sufficiently accurate for the stated purpose of this invention since they have a measurable amount of run out. Hence, it has been found more desirable to fix the arbor sleeve 74 in a non-rotatable relationship relative to center post 40 and permit the master gear 32 to rotate relative to the fixed arbor sleeve 74. To accomplish this, the flange 76 and the sleeve 74, associated therewith, are provided with a diagonal slot or cut out 82 adapted to accept a ball 84 mounted on the end of a post 86 emanating from the center post 40 and secured thereto by set screw 88.

The device as presently described gives an economical self aligning arbor which will permit the tilting of a master gear 32 about a specific point located midway between its faces on its axis. The spring loaded fingers 50 insure that the arbor sleeve 74 will return to a neutral position whenever the interaction between the teeth of master gear 32 and workpiece 28 are at the ideal condition. Similarly, this adjustable arbor permits maximum metal to metal contact between the teeth of the two gears and, hence, experienced operators in the hand rolling of gears can readily sense the presence and magnitude of such random defects as nicks in the tooth faces of the gears.

A related device is shown in FIG. 3 wherein similar parts will be designated by similar numerals with the addition of the suffix "a." In this embodiment the arbor sleeve 74a is affixed to a spherical bearing 60a which in turn is mounted on the center post 40a. The adjustable means 48a in this embodiment are provided with sensing elements attached to the spring loaded fingers 50a. Such a sensing element can be a linear differential transformer 91 which will measure the deviation of the fingers 50a from a neutral position. The impulses from such a sensing element can be transmitted by leads 90 to suitable amplifying and recording means 92 so as to permanently record by paper 94 and pen 96 the deviations of the arbor sleeve 74a from a neutral position. Such sensing elements and recording elements are well known in the art and are only generally shown for the sake of clarity of the drawings.

A second modification in this embodiment is shown in the position of the ball member 84a. In this embodiment the post 86a is provided with a double bend to position the ball 84a at a point disposed on a radius of bearing 60a located in a plane substantially perpendicular to the axis of the center post 40a. This is generally accomplished by the provision of a slot 82a located in the wall of arbor 74a and by controlling the physical thickness of post 86a so that it may be accommodated between the center post 40a and the inner wall of arbor sleeve 74a but at the same time permitting tilting or deviation from the neutral position by arbor sleeve 74a about the center point of spherical bearing 60a.

In this latter embodiment, it is possible through the sensing elements and the impulses generated to evaluate the deviations by the fingers 50a from a neutral position and thereby accurately detect and record variations in the helix angle or lead of the work gear from the master gear. Similarly, it is possible to combine, electronically, the deviations sensed by fingers 50a along with the variations in center distance measured by meter 38a. Recognition should be made of the fact that electronic linear motion sensing elements are available in the art which can be substituted for meter 38 and thus the combined impulses from the meter and fingers can be suitably amplified and recorded for analysis.

While only two embodiments have been shown for purposes of disclosing the invention, it will be apparent to those skilled in the art that other modifications can be made therein and it is my intent that I be limited only by the appended claims. I claim:

1. A self aligning arbor of the type described including a center post adapted to be inserted in an instrument aperture, means for preventing rotation between the center post and the instrument, flange means attached to and extending laterally intermediate the length of the center post, adjustable means extending upwardly from said flange means and positioned concentrically about the periphery of said center post, said adjustable means including spring loaded fingers extending upwardly away from said flange means, ball means removably fixed to the end of said center post opposite to the end positioned in the instrument, said ball being coaxial with said post, socket means mounted on and rotatable about said ball, arbor means mounted on said ball and socket adapted to accept a rotable workpiece said arbor means being coaxial with said center post, means extending from said center post to coact with and prevent rotation of said arbor means, and flange means extending laterally from said arbor means and cooperating with said spring loaded fingers for the return of said arbor means to an initial coaxial position upon deflection of the arbor means about the ball and socket center.

2. A device of the type claimed in claim 1 wherein said arbor means is a hollow sleeve which has the ball and socket joint attached intermediate its ends and wherein said center post is positioned within said sleeve in a spaced coaxial relationship.

3. A device of the type claimed in claim 2 wherein the spring loaded fingers are associated with electronic sensing elements for recording variations in deflection of the arbor flange.

4. A device of the type claimed in claim 3 wherein there are four sensing elements positioned in quadrature about the center post so as to provide an accurate record of deviations of the arbor sleeve from the ideal coaxial relationship with the center post.

5. A device of the type claimed in claim 1 wherein said rotation preventing means contacts the arbor means at a position radially of the center point of the ball and socket.

6. A device of the type claimed in claim 1 wherein said flange intermediate the length of the center post is annular in configuration and is provided with at least four adjustable means positioned in quadrature about the center post.

7. A device of the type claimed in claim 6 wherein said annular flange means are provided with a vertical upstanding skirt portion and said arbor means is provided with an annular depending skirt portion greater in diameter than said vertical skirt portion and axially overlapping so as to provide protection against damage to said adjustable means.

8. An adjustable master arbor for use in gear testing apparatus of the comparative type wherein fixed center distances are utilized to determine variations in a work gear by comparison with a master gear, including a center post having one end adapted to be accepted in a complementary aperture in gear testing apparatus, means to prevent rotation between said center post and said gear testing apparatus, annular flange means extending outwardly from said center post intermediate its length and having a skirt portion extending upwardly in a direction away from the end mounted in the gear tester, a plurality of adjustable spring loaded means positioned concentrically about said center post and extending upwardly from said annular flange spherical bearing means positioned on said center post at its end opposite to the end associated with the gear tester, arbor sleeve means affixed to said spherical bearing and supported by said bearing in a normally coaxial relationship with said center post, flange means extending laterally from said arbor sleeve and adapted to engage and be acted upon by said adjustable means whereby a tilting of said sleeve about said bearing results in a depression of one or more of said adjustable means with said adjustable means being adapted to return said sleeve to a coaxial relationship with said center post upon removal of the force creating the tilted relationship.

9. A device of the type claimed in claim 8 wherein the center post opposite the end affixed to the gear tester is reduced in diameter and is provided with a tapped bore hole in its end for accepting a headed screw, said sleeve and associated spherical bearing being removably accepted by said reduced end and capable of being removed upon removal of the screw.

10. A device of the type claimed in claim 8 wherein said spring loaded means have associated therewith electronic means for sensing the degree of depression of each means so as to provide impulse data which may be recorded showing the deviation from a coaxial relationship with the center post by the sleeve and its associated flange.

11. A device of the type claimed in claim 8 including means for preventing rotation between the center post and the arbor sleeve.

12. A device of the type claimed in claim 11 wherein said rotation preventing means is located on a radii of the spherical bearing which lies substantially in a plane passing through the center of the spherical bearing and perpendicular to the axis of the center post.

13. A gear testing device including a bed, a first slide member movably fixed along said bed and having a vertically extending fixed axis arbor thereon, a second slide member movable along said bed in the same direction as the first member and having a self aligned arbor mounted thereon whereby a pair of gears mounted on said arbors will completely mesh in spite of variations in tooth helix angle or lead, said self aligning arbor including a center post adapted to be mounted in said second member in vertical relationship thereto and substantially parallel with the arbor mounted in said first member, laterally extending flange means mounted on and positioned intermediate the length of said center post, a plurality of spring loaded means adjustably mounted on said laterally extending flange in concentric relation about said center post and extending upwardly away from said second slide member, spherical bearing means adapted to be coaxially mounted on said center post adjacent its end opposite the end associated with the testing device, sleeve arbor means mounted on said spherical bearing and coaxially surrounding said center post in spaced relation, flange means integral with and extending laterally from said sleeve arbor and adapted to cooperate with said adjustable spring loaded means whereby said spring loaded means engages said last mentioned flange means and resiliently supports same for returning the sleeve arbor to a coaxial position after application of external forces tending to tilt same in relation to the axis of the center post, means for indicating movement of said second slide member relative to said first slide member whereby variations in said two gears mounted on the arbors can be noted.

14. A device of the type claimed in claim 13 wherein said spring loaded adjustable means are provided with electronic sensing elements capable of detecting deviations of the gear mounted on the arbor from a neutral position.

15. A device of the type claimed in claim 14 wherein said gear testing device is provided with electronic means for recording deviations in center distances between the axes of the two arbors as the slides upon which the arbors are mounted move relative to one another in response to deviations in the gear teeth of the master gear and work gear.

References Cited in the file of this patent

UNITED STATES PATENTS

| | | |
|---|---|---|
| 1,536,734 | Tanner | May 5, 1925 |
| 1,663,085 | Logue | Mar. 20, 1928 |
| 2,447,445 | Widen | Aug. 17, 1948 |
| 2,563,910 | Bean | Aug. 14, 1951 |
| 2,821,024 | Nyland | Jan. 28, 1958 |